United States Patent [19]

Schluderberg

[11] Patent Number: 4,479,353
[45] Date of Patent: Oct. 30, 1984

[54] MOVING BED HEAT STORAGE AND RECOVERY SYSTEM

[75] Inventor: Donald C. Schluderberg, Lynchburg, Va.

[73] Assignee: The Babcock & Wilcox Company, New Orleans, La.

[21] Appl. No.: 419,268

[22] Filed: Sep. 17, 1982

Related U.S. Application Data

[62] Division of Ser. No. 89,824, Oct. 31, 1979, Pat. No. 4,361,009.

[51] Int. Cl.³ .......................... F01K 3/00; F28D 19/02
[52] U.S. Cl. ...................................... 60/659; 165/145; 165/159
[58] Field of Search ................. 60/659, 652; 165/144, 165/145, 159, DIG. 27, 107 R, 104.15, 104.18

[56] References Cited

U.S. PATENT DOCUMENTS

| | | | |
|---|---|---|---|
| 1,614,387 | 1/1927 | Pereda | 165/104.18 |
| 1,904,153 | 4/1933 | Lucke | 165/104.18 |
| 3,886,749 | 6/1975 | Pacault | 60/652 |
| 3,908,632 | 9/1975 | Poulsen | 165/104.18 X |
| 3,998,695 | 12/1976 | Cahn et al. | 60/659 X |
| 4,003,786 | 1/1977 | Cahn | 60/659 X |
| 4,158,385 | 6/1979 | Vandenhoeck | 165/107 |

Primary Examiner—Allen M. Ostrager
Attorney, Agent, or Firm—Robert J. Edwards; Mark B. Quatt

[57] ABSTRACT

An energy storage and recovery system designed for storing excess over demand energy generated by a steam cycle electrical generating plant during slack electricity demand periods and for recovering the stored energy to provide supplemental electricity during peak demand periods.

The system utilizes one or more moving bed heat exchangers for transferring heat between the steam cycle of the power plant and a moving bed of refractory particles. Pipes and valves establish fluid communication between the heat exchangers and the steam cycle to supply fluid to selectively heat the moving bed of refractory particles or to cool them as the case may be.

One or more insulated silos are provided for storing the refractory particles and means are provided for transporting the particles between the silos and the heat exchangers.

6 Claims, 12 Drawing Figures

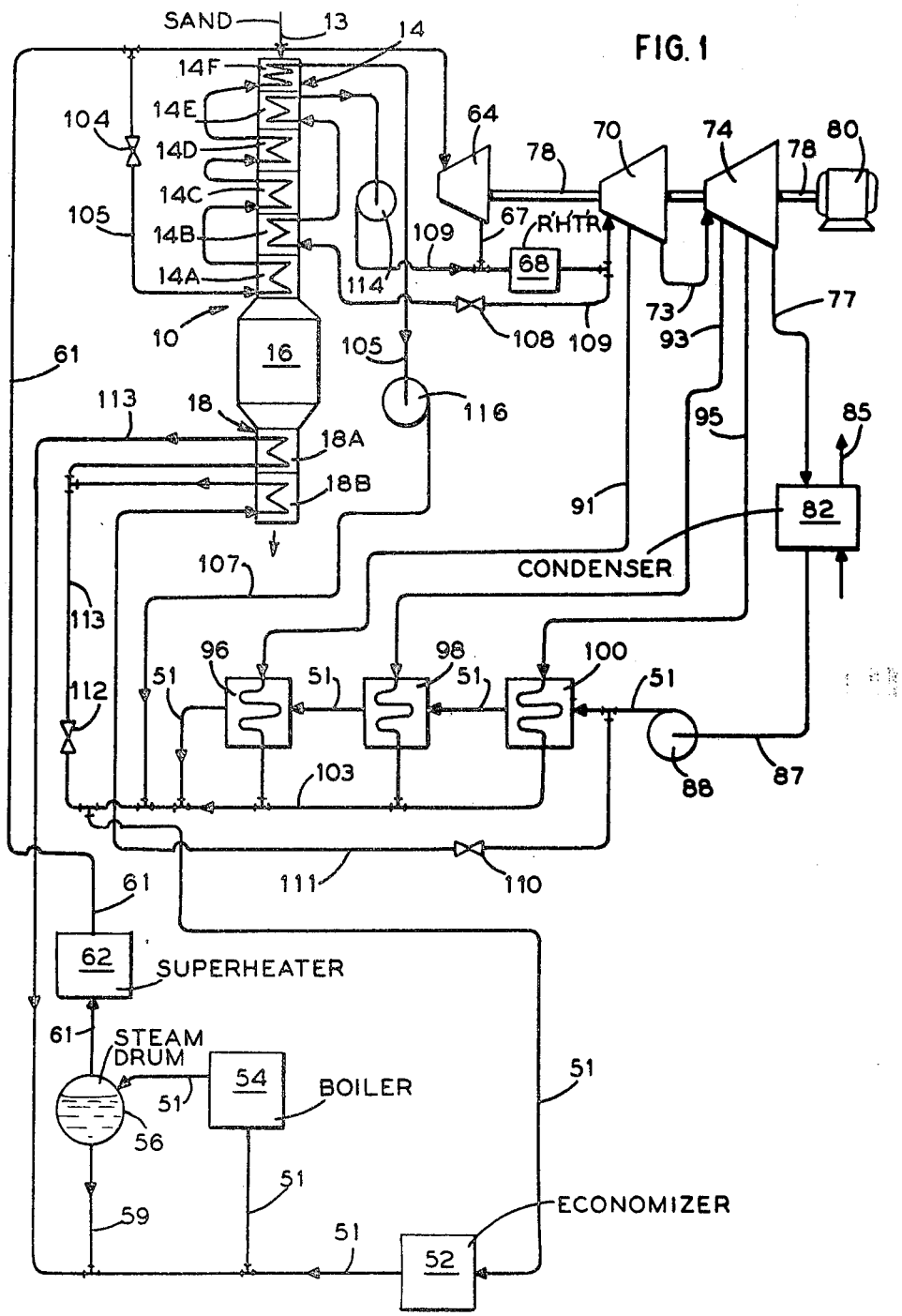

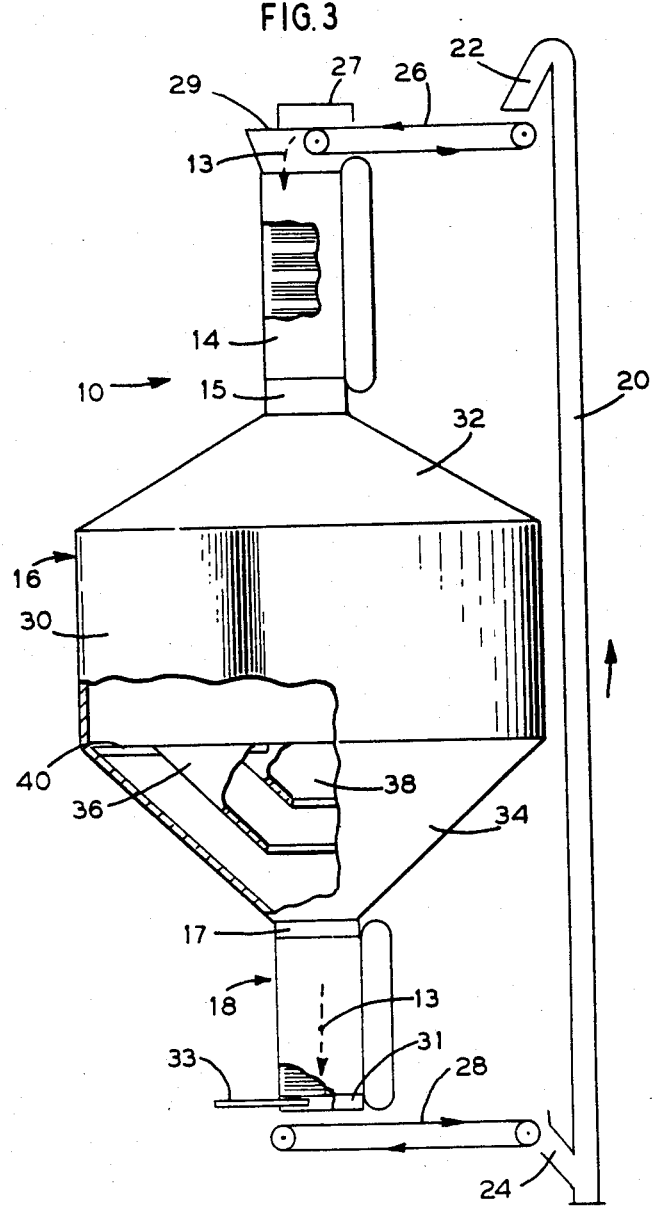

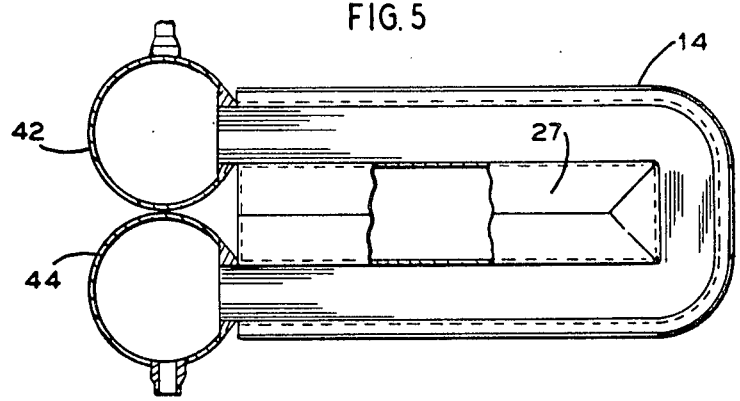
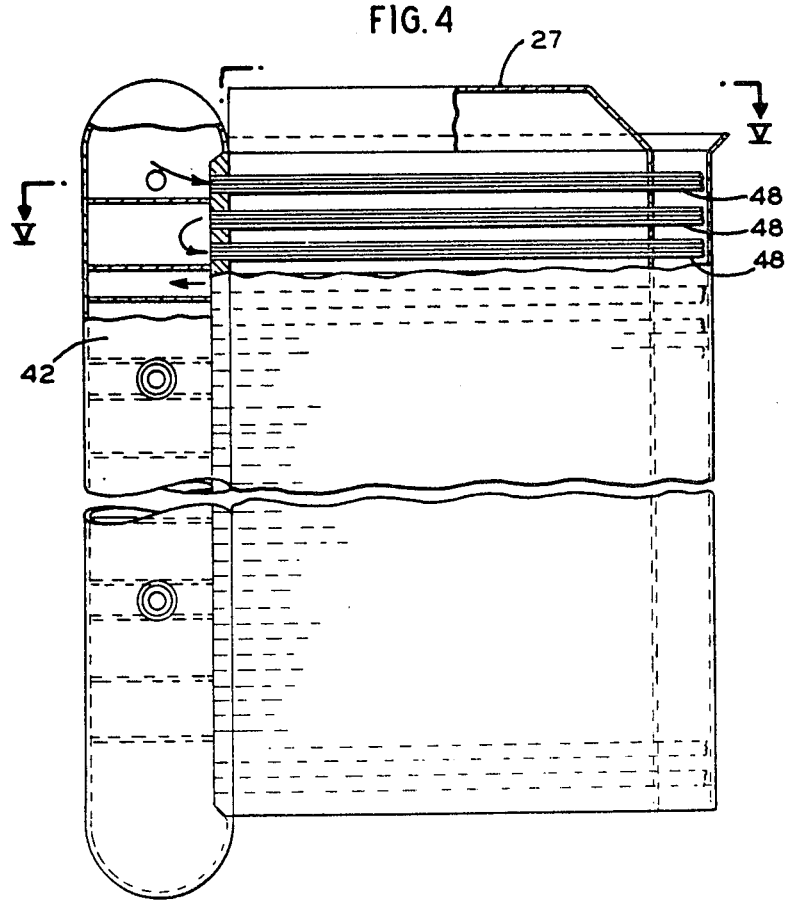

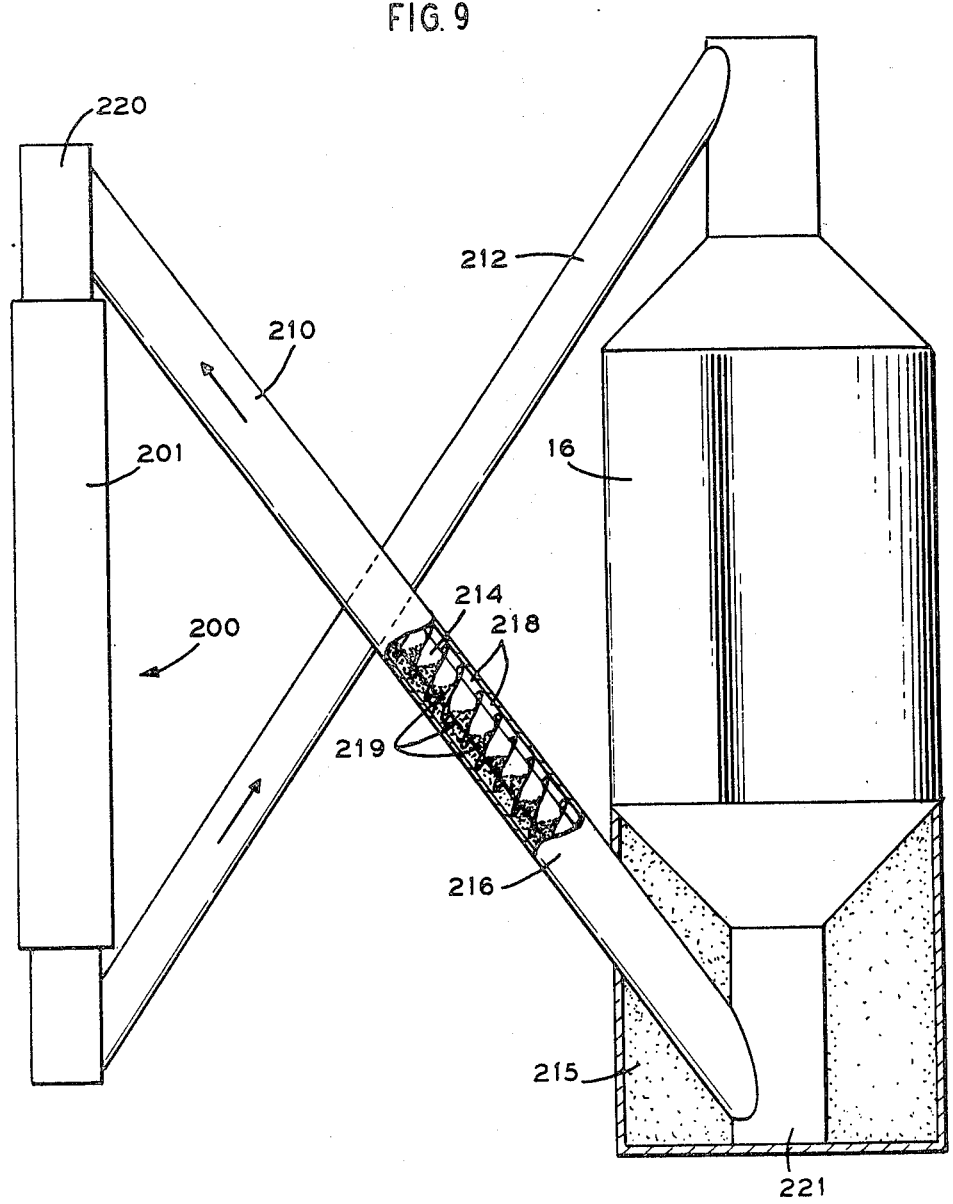

MOVING BED HEAT STORAGE AND RECOVERY SYSTEM

This application is a division of application Ser. No. 06/089,824, filed Oct. 31, 1979, now U.S. Pat. No. 4,361,009.

BACKGROUND

The present invention relates to energy storage and in particular to a thermal energy storage system utilizing moving bed heat exchangers.

Electricity produced by an electric power generating plant must be consumed immediately or it is lost. The demand for electricity from such a plant is not constant but varies throughout the day. Therefore electric power generating plants must be designed to operate over a range of production levels and moreover, to be capable of producing enough electricity to satisfy peak demands.

Designing the plant to peak load capacity is inherently uneconomical in that plant construction costs are proportional to capacity. Ideally the plant could be constructed at average load level capcity thereby avoiding the higher construction costs for peak capacity. In order to do this, peak demands must be met by some supplemental source. Present available sources of supplemental energy for use during peak demand periods include diesel engines, additional fossil fired steam turbine-generators, and stored energy.

The present invention is an energy storage system designed to supply peak demand energy for an electric generating facility. According to the invention, the electric generating plant operates at a constant average load fuel consumption rate. During slack demand periods, when electricity is consumed at less than the average rate, the storage system is charged by the surplus energy generated. During peak demand periods when electricity is consumed at higher than the average rate, the storage system is tapped to enable production of the needed additional electricity while the main energy source, e.g. fossil boiler or nuclear reactor, continues to operate at a constant rate.

Of the energy storage systems available in the prior art, pumped hydro is the most feasible. In the pumped hydro system surplus electricity generated during slack demand periods, is used to pump water to higher elevation, usually into a dammed lake, where it is retained. During high demand periods, the water is released to flow down through hydro turbines, thereby generating needed electricity. Unfortunately, pumped hydro energy storage is limited in application by a paucity of acceptable sites for building dams and is further limited by opposition from environment conscious groups opposing dam construction.

Another storage system available to steam cycle electric generating plants is the removal of thermal energy directly from the steam cycle during slack demand periods to be stored for later utilization high demand periods. One such system known in the prior art diverts steam from the steam cycle to heat oil. Hydro carbons such as oil have heat storage properties superior to those of water. However, oil typically loses its integrity if heated beyond 650 degrees Fahrenheit and is limited thereby. Steam temperatures in modern fossil fired plants can exceed 1,000° F. It is desirable to heat the energy storage medium to the highest temperature possible to maximize heat recovery efficiency. The hot oil system is therefore inherently limited in that it cannot be used at the highest temperatures possible because of its loss of integrity. Moreover, no known liquid maintains its integrity at 1000° F. at moderate pressures. Solids, however, are superior heat storage mediums in that they maintain integrity at elevated temperatures and at low pressure. Also, more heat per unit volume can be stored in solids than in liquids because of the greater density of the solid notwithstanding a possible lower specific heat capacity.

One known system utilizing a solid for energy storage diverts hot fluid through holes in a solid block during slack demand periods thereby charging the block, ie., raising the temperature of the solid. During high demand periods, the block is used to heat cooler steam or water thereby discharging the block, ie., returning the energy to the system. This system may be used at high temperatures, however, it has an inherent disadvantage. The temperature of the block during discharge thereof is not constant but rather is decreasing. As the temperature of the block decreases, the efficiency of heat transfer likewise decreases, resulting in a declining energy yield.

The present invention uses a bed of free-flowing refractory particles for heat transfer and heat storage and provides both a solid heat storage medium for use at high temperature and a constant temperature heat source during system discharge.

Apart from prior art in the field of heat storage technology, prior art exists in the field of free-flowing solid granules or microspheres as a mechanism for heat storage and transfer for advanced energy source power reactors. A typical description of research in this field is described in the paper titled, "Moving Bed Heat Transfer for Advanced Power Reactor Applications" published by Mr. D. C. Schluderberg and Mr. T. A. Thornton at the Miami International Conference on Alternative Energy Sources, in Miami Beach, Fla., Dec. 5 through 7, 1977. This paper reported the result of some tests conducted with gravity flow moving beds of free-flowing microspheres over spiral tubing in a small laboratory-scale apparatus.

A number of proposals also were described in this paper for recirculating articles from a hot reservoir through a steam generator to a cold reservoir for subsequent recirculation by means of an Archimedes spiral lift tube arrangement to the heat source and back to the hot particle reservoir.

The concept of particulate material as a heat transport mechanism also has been the subject of intensive research. The following collection of patents, for instance, are illustrative of the work that has been accomplished in this field of technology. U.S. Pat. No. 2,672,671, granted Mar. 23, 1954, for alumina-mullite pebbles is directed to a method of manufacturing high purity mullite-alumina pebbles that are capable of enduring severe conditions of cyclic thermal and mechanical shock. U.S. Pat. No. 2,644,799 granted July 7, 1953, for heat-exchange pebbles discloses the broad concept of a gravity-flow mass of pebbles for discharging stored heat. The cooled pebbles after heat discharge, are recirculated by means of a bucket or screw conveyor. U.S. Pat. No. 2,808,494, granted Oct. 1, 1957 for "Apparatus For Storing and Releasing Heat" shows a gas or oil fired system for heating an immobilized mass of powder or spheres in an heat storage apparatus.

U.S. Pat. No. 2,856,506, granted Oct. 14, 1958 for "Method for Storing and Releasing Heat" is a division of U.S. Pat. No. 2,808,494 and largely duplicates the disclosure in the '494 patent.

U.S. Pat. No. 3,615,187, granted Oct. 26, 1971 for "Process for the Production of Spherical Alumina-Silica Containing Solid Particles Which are Predominantly Mullite" is directed to production of the solid particles rather than to some application techniques.

U.S. Pat. No. 3,669,889, granted June 13, 1972, for "Granular Ceramic Heat Carrier Intended for Manufacture Thereof" describes a granular ceramic heat carrier for use in conjunction with chemical processes. The method for manufacturing these granules also is described in this patent.

In spite of the intensive research that has been applied to this general area of technology and clear energy conservation benefits of a practical adaptation of these techniques notwithstanding, there is, nevertheless, a continued need to come forward with more efficient moving bed and heat exchanger combinations. Further in this respect, there is a requirement to adapt this technology to practical heating power plant generation cycles in order to make this technology immediately available to the power utility industry.

These and other problems are satisfied to a large extent through the practice of the present invention wherein an arrangement of one or more silos are provided for absorbing heat from a mass of microspheres or other suitable particulate material. The microspheres absorb heat by flowing under gravitational force over heat exchanger tube bundles. Heat is provided illustratively from low and high-pressure heat water and reheat steam in a conventional power plant.

In the present invention, the plant steam turbine output is modulated while fuel consumption remains constant. In typical steam cycle electric generating plants, portions of the cycle steam are at various points extracted for heating feedwater flow from the condenser to the steam generator in order to increase cycle efficiency. In the present invention, during off-peak periods, the steam generator remains at full power while turbine output is lowered by increasing extraction steam flow at various points in the steam cycle thus lowering flow rate to the turbines. The flow extracted above the normal amount is used to heat the storage inventory of moving bed solids.

The extraction steam flows through a moving bed heat exchanger while moving bed materials flow down therethrough by gravity. In this way, by permitting the particulate matter to absorb from different temperature steam supplies within the power plant system a much more efficient heat storage and transfer system is provided. This system, moreover, is readily adaptable to the reheat steam cycle that characterizes many modern power generation plants today.

The hot moving bed solids are then stored in an insulated bin until needed. When peak demand power is required, the hot solids flow through a moving bed heat exchanger to heat feedwater flow directed therethrough, thereby allowing a reduction of extracted steam flow below normal. This reduction in extracted steam results in increased turbine output and increased electricity generation.

In this manner, heat storage is used to vary plant power output above or below an established baseload while power input from the plant heat source is held constant at a level corresponding to the base load electrical output.

An object of the present invention is an energy storage and recovery system for storing excess energy generated by an electric power plant during slack demand periods and for recovering the stored energy to provide energy for producing supplemental electricity during peak demand periods.

A further object of the invention is a system yielding for foregoing advantages and which utilizes a moving bed of refractory particles for a heat transfer and storage medium.

Another object of the invention is a system yielding the foregoing advantages and which can be back fitted to existing power plants.

A further object of the invention is a system yielding the foregoing advantages and which can be used with fossil fueled plants or nuclear plants.

Other objects and advantages of the present invention will be readily apparant from the following description and drawings which illustrate the preferred embodiments of the present invention.

SUMMARY OF THE INVENTION

The present invention involves a heat storage and recovery system for storing excess over demand energy generated by a steam cycle electrical generating plant during slack electricity demand periods and for recovering the stored energy to provide supplemental electricity during peak electricity demand periods.

The system utilizes one or more moving bed heat exchangers for transferring heat between the steam cycle of the power plant and a moving bed of refractory particles. Pipes and valves establish fluid communication between the heat exchangers and the steam cycle to supply fluid to selectively heat the moving bed of refractory particles or to cool them as the case may be.

One or more insulated silos are provided for storing the refractory particles and means are provided for transporting the particles between the silos and the heat exchangers.

BRIEF DESCRIPTION OF THE DRAWINGS

FIG. 1 is a schematic diagram of a fossil fired electric power generating plant steam cycle utilizing an energy storage system according to the present invention.

FIG. 3 is a partial cutaway elevation view of a preferred embodiment of moving bed heat transfer and storage equipment of a system according to the present invention.

FIG. 4 is a view like FIG. 3 of a heat exchanger of FIG. 3.

FIG. 5 is a view taken along line V—V of FIG. 4.

FIG. 9 is a view like FIG. 8 showing a one silo one heat exchanger arrangement.

DETAILED DESCRIPTION

Figure 8:
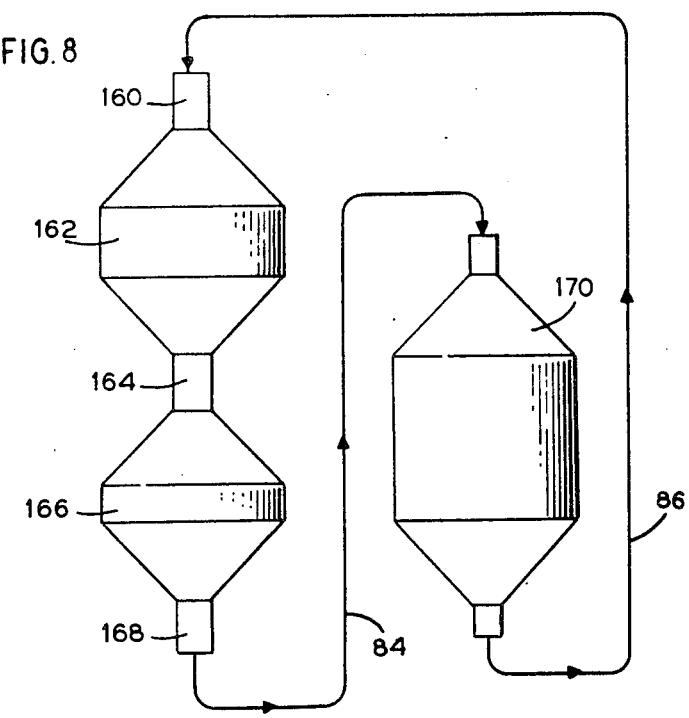
FIG. 8 is a view like FIG. 7 of a 3 silo system.

Refer now to FIG. 1, there being shown schematically an energy storage system according to the invention incorporated into a fossil fired electricity generating plant steam cycle. The steam cycle shown in FIG. 1 is a simplified version showing only necessary component parts. Typically, such systems incorporate more intricate steam bleed and feedwater heating features and other efficiency related features not pertinent to the invention and therefore not shown in the figure.

The fossil fired steam cycle of FIG. 1 is isolated from the heat storage system by valves 104, 108, 110 and 112. In the steam cycle, system water, or steam as the case may be, is heated by hot combustion gases in four sections: economizer 52, boiler 54, superheater 62, and reheater 68. Subcooled water in line 51 flows through economizer 52, wherein the water is heated to near boiling temperature. The water then flows through boiler 54 wherein it is raised to boiling temperature and converted to steam. Line 51 empties into the steam drum 56 wherein any unboiled water precipitates to the bottom thereof and flows through line 59 and into line 51 to be recirculated through boiler 54. Steam, from steam drum 56, flows through superheater 62 via line 61 wherein the temperature of the steam is raised above the boiling temperature, ie., superheated.

The steam continues through line 61 to expand through and turn high pressure turbine 64. The steam exits turbine 64 via line 67, is reheated in reheater 68, and enters intermediate pressure turbine 70. The steam expands through intermediate pressure turbine 70 and exits via line 73 to enter low pressure turbine 74. The steam again expands in low pressure turbine 74 and exits via line 77.

Turbines 64, 70, and 74 and electrical generator 80 are mounted on a common shaft 78.

The steam then enters condenser 82 and therein heats condensing fluid in line 85 and condenses to water.

The heat gained by the condensing fluid in line 85 is eventually dissipated to the environment, e.g., by discharging into a body of water or by evaporation into the air via a cooling tower (not shown).

The water in line 87 is then pumped up to feedwater pressure by pump 88 and enters feedwater line 51. Steam is extracted from intermediate pressure turbine 70 via line 91 and from low pressure turbine 74 via line 93 and 95 for heating feedwater in line 51. Steam in lines 91, 93 and 95 flow through feedwater heaters 96, 98 and 100, respectively, being condensed therein collected in line 103 and fed into line 51. The purpose of feedwater heating is to increase cycle efficiency. The water in line 51 now flows back to econimizer 52, completing the cycle efficiency.

The above described portion of FIG. 1 pertains to a fossil fired steam cycle without energy storage capacity. The below described energy storage system according to the invention is added to the above described cycle to increase peak generating capability.

The primary component of the energy storage system, silo, generally designated by reference numeral 10, is shown schematically in the system diagram of FIG. 1 and in more detail in FIG. 3.

Referring to the schematic diagram, FIG. 1, the silo 10 includes charging heat exchanger, storage bin 16, and discharging heat exchanger 18.

Free-flowing refractory particles are utilized as a heat storage medium. These particles should be spherical in shape, have a uniform size of about 100 microns and be inexpensive. Acceptable materials include silica sand, barytes sand (barium sulfate), partially calcined clay, glass beads and reclaimed petroluem catalysts. In the embodiment of the invention described herein, silica sand is used as the heat storage medium.

During slack electrical demand period, sand 13 is poured down through the exchanger 14 being heated therein. Heated sand 13 falls from heat exchanger 14 to bin 16 to be retained therein.

Heat exchanger 14 is divided into sections 14a, 14b, 14c, 14d, 14e and 14f. During slack electricity demand periods, steam is diverted from the cycle and routed through heat exchanger 14. The resulting decreases in the flow rate of the steam entering the turbines reduces turbine shaft 78 and generator 80 speed and thereby reduces electricity generated by generator 80. With valve 104 open, superheated steam is extracted from line 51 and routed to steam generator section 14a via line 105. Line 105 exits section 14a and continues in turn through section 14c, 14d and 14f. The steam is reduced to saturation temperature in sections 14a and 14c condensed in section 14d and cooled to feedwater temperature in section 14f. Subcooled water in line 105 is pumped back to feedwater line 51, via line 107 by pump 116.

With valve 108 open, additional steam is extracted from line 67 downstream of reheater 68 and routed via line 109 through heat exchanger section 14b and section 14e being cooled therein to pre-reheat temperature and returned to line 67 upstream of reheater 68 by pump 114.

Figure 2:
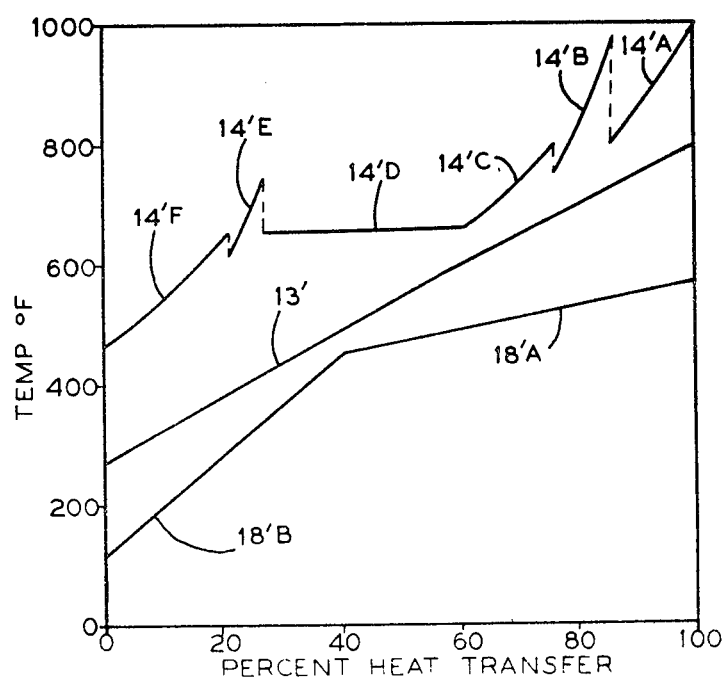
FIG. 2 is a graph showing the temperature of the moving bed refractory particles through the moving bed heat exchanger of FIG. 1 as a function of percent heat transferred.

Refer now to FIG. 2 showing typical temperature curves for heat exchangers 14 and 18 as a function of percent heat transferred to and from sand 13 respectively. Curve 13' represents the temperature of sand 13 as a function of percent heat transferred. As sand 13 enters heat exchanger 14 at about 270° F., no heat has yet been transferred. As sand 13 leaves heat exchanger 14 at approximately 800° F., sand 13 will gain no more heat therefore percent heat transferred equals 100 percent. Curve 13' would be a straight line function if the specific heat capacity of sand 13 was constant. However, heat capacity is not constant but rather a function of temperature and therefore curve 13' is slightly curved.

Curves 14'a, 14'c, 14'd, and 14'f represent the steam/water temperature in line 105 of FIG. 1 as it passes through heat exchanger sections 14a, 14c, 14d and 14f respectively. Curve 14'b and 14'e represent the steam temperature of line 109 as it passes through heat exchangers 14b and 14e respectively.

Refer back to FIG. 1. During peak demand periods, heated sand 13 is released from bin 16 through heat exchanger 18 being cooled therein. Heat exchanger 18 is divided into two sections, 18a and 18b. Opening valve 110 allows feedwater from line 51 upstream of reheaters 96, 98 and 100 to enter line 111 and pass through section 18b being heated therein to downstream reheater temperature. Opened valve 112 allows feedwater downstream of feedwater heaters 96, 98, and 100 to enter line 113 being joined by line 111 to pass through section 18a and rejoin main feedwater line 51 downstream of economiser 52.

Refer now to FIG. 2. Curves 18'b and 18'a represent the water temperature in lines 111 and 113 respectively through heat exchangers 18b and 18a respectively. FIG. 2 illustrates the judicial selection of points in the steam cycle from which steam is extracted, and the selective routing to heat exchanger sections to maintain adequate temperature differences between steam and sand 13 in the heat exchangers.

Further, extraction flowrates and sand flowrates are chosen such that steam or water, as the case may be reenters the steam cycle at the temperature of the steam cycle fluid at the reentry point.

With charging heat exchanger 14 operating at the temperatures of FIG. 2, the mass flowrate in line 105 is about 180,000 pounds per hour, the mass flowrate in line 109 is about 150,000 pounds per hour, and the mass flowrate of sand is about 1.7 million pounds per hour.

With discharging heat exchanger 18 operating at the temperatures of FIG. 2, the mass flowrate of water through line 111 is about 150,000 pounds per hour and about 670,000 pounds per hour through the line 113 with a sand mass flowrate of about 1.0 million pounds per hour.

With a charging mass flowrate of 1.7 million pounds per hour and a discharging mass flowrate of 1.0 million pounds per hour, the period of discharge is obviously longer than the period of charge. The system may be designed to accommodate a particular power plant's peaking cycle. Baffles (not shown) of heat exchangers 14 and 18 limit sand 13 flowrate.

During peak electricity demand periods, operation of heat exchanger 18 as above described increase the enthalpy of feedwater entering the boiler above normal enthalpy levels resulting in the production of steam in the boiler at a faster rate and a lower fraction of water being returned to the boiler via line 59. The increased steam flow rate turns the turbines faster and thereby increases generator electrical output to satisfy peak electricity demands.

Refer now to FIG. 3, there being shown silo 10 in accordance with a preferred embodiment of the invention. Storage bin 16 of silo 10 includes a hollow cylindrical barrel 30 topped by inverted funnel shaped upper cover 32 and enclosed on the bottom by funnel shaped lower cover 34. Upper cover 32 is open at the top. Heat exchanger 14 is positioned above storage bin 16 and connected thereto via duct 15. Conical baffles 36 and 38 are disposed interior to lower cover 34 and are open at the top and the bottom. Baffles 36 and 38 are supported by horizontal support grid 40. Any suitable support structure that will not obstruct the sand flow may be used in grid 40. Baffles 36 and 38 ensure that sand empties into heat exchanger 18 uniformly. In the absence of baffles 36 and 38, sand 13 in the center of bin 16 would sink faster than sand 13 near the walls of bin 16. Bin 16 communicates with heat exchanger 18 via connecting conduit 17.

Conveyor 28 is positioned to receive sand 13 flowing out of heat exchanger 18 and to deposit sand 13 into receiver 24 of bucket elevator 20. Bucket elevator 20 extends up above the top of silo 16 and empties through spout 22 to conveyor 26 positioned thereunder. Conveyor 26 extends from spout 22 to above heat exchanger 12. Diverters 27 divert sand from conveyor 26 into hopper 29.

Silo 10 according to the invention operates in either a charging mode or a discharging mode. In operation of the charging mode, bin 16 is initially filled with cold sand 13. To heat sand 13, steam extracted from the steam cycle of an electric generating plant during a slack electric demand period is diverted through heat exchanger 14. Plate 33 is withdrawn allowing sand to flow through perforated plate 31, out of silo 16 and onto to conveyor 28. Sand 13 is carried by conveyor 28 and falls off into receiver 24. Bucket elevator 20 lifts sand 13 to the top thereof to be poured out spout 22 and deposited on conveyor 26. Bucket elevators are commercially available being capable of operating under the desired conditions. One such bucket elevator is available as model F10 from Universal Industries, 1575 Big Rock Road West. Waterloo, Iowa 50701. Sand 13 is then conveyed over heat exchanger 14 by conveyer 26 deposited therein. Diverter 27 is angled to divert sand 13 from conveyor 26 and into hopper 13. Sand 13 flows down through heat exchanger 14 being heated therein and through neck 15 and into bin 16.

A static, subtle bed of the refractory particles has a sufficiently low thermal conductivity, such that it is possible to store separate quantities of hot and cold bed material in the silo 16 without significant heat transfer between them. Silo 16 can therefore remain full while containing varying amounts of hot and cold material depending on point in time for the heat storage cycle. For this reason, storage volume tends to be 50 percent less than for systems using heat transfer fluids stored in separate hot or cold tanks.

Figure 11:
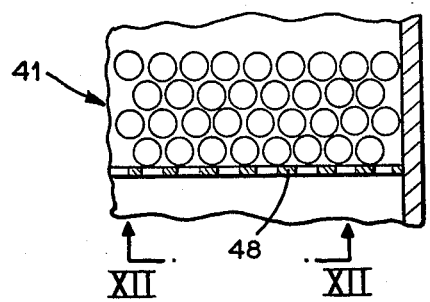
FIG. 11 is a partial elevation view of tube banks according to the present invention.
Figure 12:
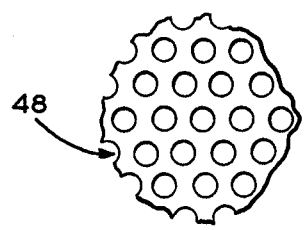
FIG. 12 is a partial bottom view taken along line XII—XII of FIG. 11.

Turning now to FIGS. 4 and 5, a typical steam generator arrangement for heat exchanger 14 is shown. Inlet header 42 establishes fluid communication with the tubes in tube bank 41. The tubes in this bank are arranged in vertical segments, each of the ends of the segments being supported by perforated baffle plates 48. Steam generated within tube bank 41 is discharged from the heat exchanger 14 by way of a communicating steam outlet header 44. Immediately below the heat exchanger 21 the discharge shutter or orifice plate 33 (FIG. 3) is positioned to control the density of the bed of flowing paticles 13 which are flowing over the tubes in the tube bank 41. The individual tubes in the tube bank 41 are arranged in a generally horizontal orientation in a staggered array that is designed to promote a high degree of flow mixing with the particles 13. In these conditions heat transfer coefficients are expected to exceed those achieved in a fluidized bed (which bed would have the same particles in surrounding gas) by a factor of 5 or more. Such results appear quite reasonable when it is remembered that particle concentrations and velocities on the heat transfer surface in a fluidized bed are much lower. Furthermore, contact with streams of the most dense mixtures (which flow downward around the rising bubble) is intermittent and somewhat uncontrollable at any given location. Turning once more to the illustrative steam generator 14 shown in FIGS. 4 and 5, for the purpose of this specific embodiment of the invention, diaphragms are used in the vertical headers to produce the desired size, tube side flow pass in each heating or cooling section, and also to separate heating sections operating at different steam pressures. The horizontal tube banks consist of 0.75-inch outside diameter tubes on 0.85-inch triangular pitch with 17 tubes per row (see FIG. 11). Tube ends are swaged to 0.625 inch outside diameter to provide adequate tube sheet ligament. Casing walls for the heat exchangers are horizontally corrugated in order to prevent the particles 13 from passing along the casing walls. Tube rows, moreover, are spaced by use of 0.10 inch thick rings (not shown) spaced at suitable intervals along each tube, extra vertical spacing between tubes at header diaphragm locations are fitted with perforated orifice plates 48 (FIG. 12) to maintain the even particle flow velocity over the tube bank above and assure a high bed density in contact with the entire tube periphery. Orifice plates in turn rest upon support steel to carry the vertical load and tube weight in each bank.

Existing plants appear suitable for tolerating suitable increases in extraction steam flow and to decrease in turbine throttle flow for the charge mode of the moving bed thermal storage cycle described above. However, a peaking steam generator and turbine generator are required, to provide the on-peak desired power, unless the plants turbine-generators have excess superheat capability beyond base load.

Figure 6:
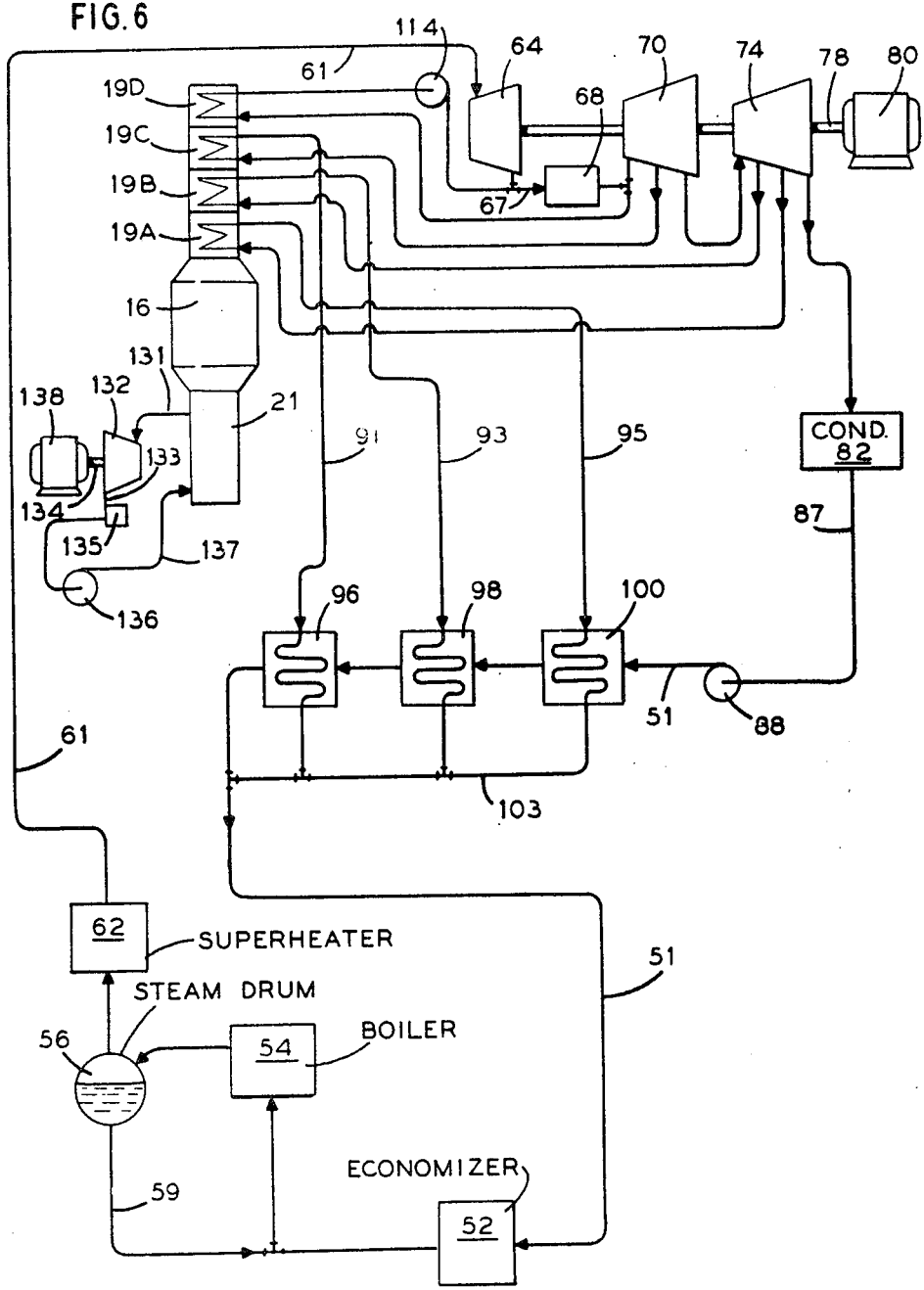
FIG. 6 is a schematic diagram like FIG. 1 showing an alternate embodiment of the invention.

Refer now to FIG. 6 wherein another embodiment of the present invention is shown. FIG. 6 illustrates the same steam cycle of FIG. 1 wherein a peaking steam cycle is provided because the existing turbine generators are not capable of stretched operation. Steam is generated in dishcarge heat exchanger 21, flows via line 131 to turbine 132 to expand therethrough. The cycle continues through condenser 135 and pump 136 and back to heat exchanger 21 to complete the cycle. Peaking generator 138 is driven by turbine 132 via shaft 134.

Also shown in FIG. 6 is the use of extraction steam from lines 91, 93 and 95 in charging heat exchanger sections 19c, 19b and 19a, respectively. Reheat steam is utilized in section 19d as above described for FIG. 1.

Figure 7:
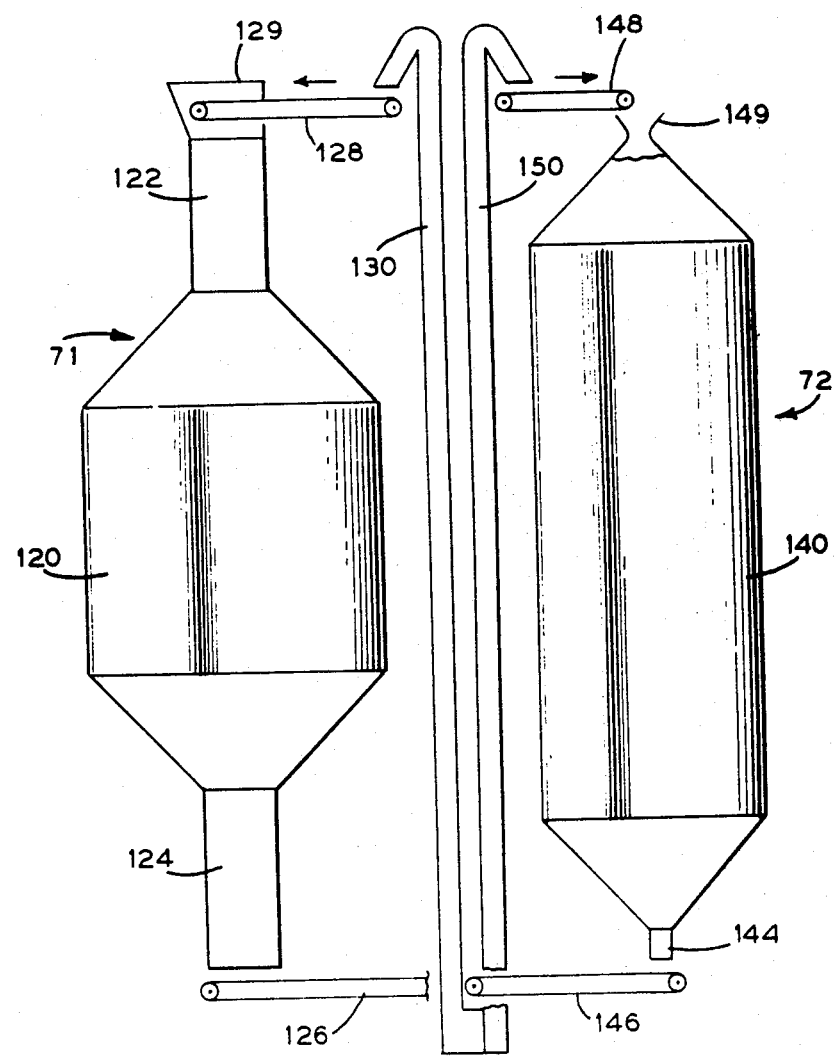
FIG. 7 is an elevation view of a two silo system according to the present invention.

Refer now to FIG. 7 which shows a two-silo system which avoids the need for internal distribution baffles and allows greater latitude in silo proportions aimed at achieving lower capital costs. It also provides greater adaptability to variatons in system peak-load characteristics. Thus, as shown in FIG. 7, two silos are provided, a hot silo 71, and a cold-surge silo 72. Hot silo 71, is continuously serviced by operating the fossil-fired heat source to supplement the daily off-peak available energy. This heat is applied to the particulate matter within the silo by way of a continuous charge heat exchanger 122, in which illustratively, hot gas or air provides the heat source. Heat exchanger 122 is mounted in the heat charging section of silo 71, immediately below the conveyor belt 128. Hot silo 71 has immediately below the continuous charge heat exchanger, a heat storage section 120, which in turn is immediately above the discharge heat exchanger 124, thus, discharge heat exchanger 124 extracting heat from the flowing particles produces steam of a suitable quality. The now cool particles flow from silo 71 onto a discharge conveyor 126 for transportation to a conventional bucket elevator 150 for recycle through the system via conveyers 146 and 128 and bucket elevator 130 in the manner previously described in connection with FIG. 3.

Particles stored in cold-surge silo 72 vary plant output above or below an established base load, while power input from the plant heat source is held constant at a level corresponding to the base load while power input from the plant heat source is held constant at a level corresponding to the baseload requirements. The objective of these systems is to provide intermediate, on-peak load power at combined fuel and capital cost which is favorable when compared with competing methods such as oil-fired gas turbines, pumped hydro, combined cycles or additional system tie-in.

Pressurized water nuclear power reactor applications can utilize a triple silo arrangement to permit the combined use of off-peak nuclear heat together with continuous input from suitable coal-fired equipment.

The boiling water reactor also could use a triple silo arrangement but would also require a reboil that would produce uncontaminated, that is, dry steam if off-peak nuclear heat for it to be stored. Liquid metal fast breeder reactors and high temperature gas cooled reactors have a variety of options, facilitated by higher operating temperatures and low fuel costs wherein a two or three silo arrangement would be used to meet varying amounts of intermediate on-peak load with or without additional fossil heat.

Further efficiencies in nuclear power systems can be maximized by supplementing the nuclear heat with fossil fuel produced heat to produce higher bed temperatures.

FIG. 8, for example, shows a heat storage system operating on the basis of a 30 percent nuclear heat and 70 percent coal combination. Heat loss per day was assumed to be 7.5 percent. The silo system shows first silo 162 in which the charging heat exchanger equipment receives its heat from input off-peak nuclear energy. This silo stores particles at 505 degrees Farenheit and discharges these particles into heat exchanger 164 which is serviced continuously by heat from the coal-fired source of steam. These heated particles then flow through silo 166, when appropriate, to be discharged over heat exchanger 168 in order to produce steam at appropriate conditions. The discharged particulate material then is conveyed in the direction shown by line 84 to the inlet of a third silo 170 where the particles are stored at 275 degrees Farenheit. Note in this respect that the particles were stored at a temperature of 1,025 degrees Farenheit in silo 166.

Discharged particles from silo 170 then flow in the direction indicated by means of line 86 back to silo 162, first flowing over the off-peak nuclear energy supplied heat in the heat exchanger 160 at the inlet to the silo 162. This silo system was designed to provide 18 megawatts electric power output for 11.5 hours which complies with a 200 megawatt electric plant base load output. Overall plant thermal efficiency was taken as 33 percent. In operation, during off-peak periods the entire inventory of silo 170 flows through the nuclear steam heated section in heat exchanger 160 to enter the silo 162.

However, during this time, there is a continuous flow of particles out of silo 162 and into silo 166. During the 14-hour discharge period, particles will flow from silo 166 into silo 170. In this way, a three-silo system stores off-peak reactor thermal energy and supplements it with continuously supplied energy from coal or some other fossil fuel. Thus, there is provided in accordance with the invention, an improved system for storing heat during off-peak load conditions and utilizing this stored heat to supplement plant steam generating capacity at peak load conditions.

Refer now to FIG. 9 showing an alternate embodiment of the present invention. A single moving bed heat exchanger 200 is used in this embodiment to both heat and cool the sand. A pair of Archemedes lifts 210 and 212 transport the sand between heat exchanger 200 and silo 10.

Fluid to be cooled or heated flows through tube bank 201. Moving bed material flows down through heat exchanger 200 around tube bank 201 to be charged by extracted steam or to be discharged by heating feedwater flow in the manner described above. In this embodiment adequate piping and valves (not shown) are provided to supply either extracted steam or feedwater to the steam cycle side of moving bed heat exchanger 200 for either charging or discharging respectively.

In the embodiment of FIG. 9 bin 16 is supported by earth 215. This manner of support allows for more economical bin structure and provides insulation for minimizing heat loss from bin 16.

Archemedes lifts are well known in the art and comprise an inclined threaded screw 214 encased by a cylinder 216. As screw 214 and casing 216 turn together, material laying on the bottom edge of the screw is transported upward along the screw threads.

In FIG. 9, sand is transported by Archemedes lifts 212 and 210 in this manner. To minimize effort required to turn the lifts 210 and 212 the individual pockets of sand laying therein are fluidized, thus, decreasing the friction between the sand and the lifts. Illustratively, this can be accomplished by maintaining a pressure differential between end 220 and end 221 of lift 210. The resulting air forced through lift 210 bubbles through pockets of sand 219 to fluidize them. By sealing ends 220 and 221 air 218 pumped by lifts 210 itself is forced back through sand pockets 219 to fluidize them. Alternatively, a blower (not shown) may be provided to pump air through lift 210.

Figure 10:
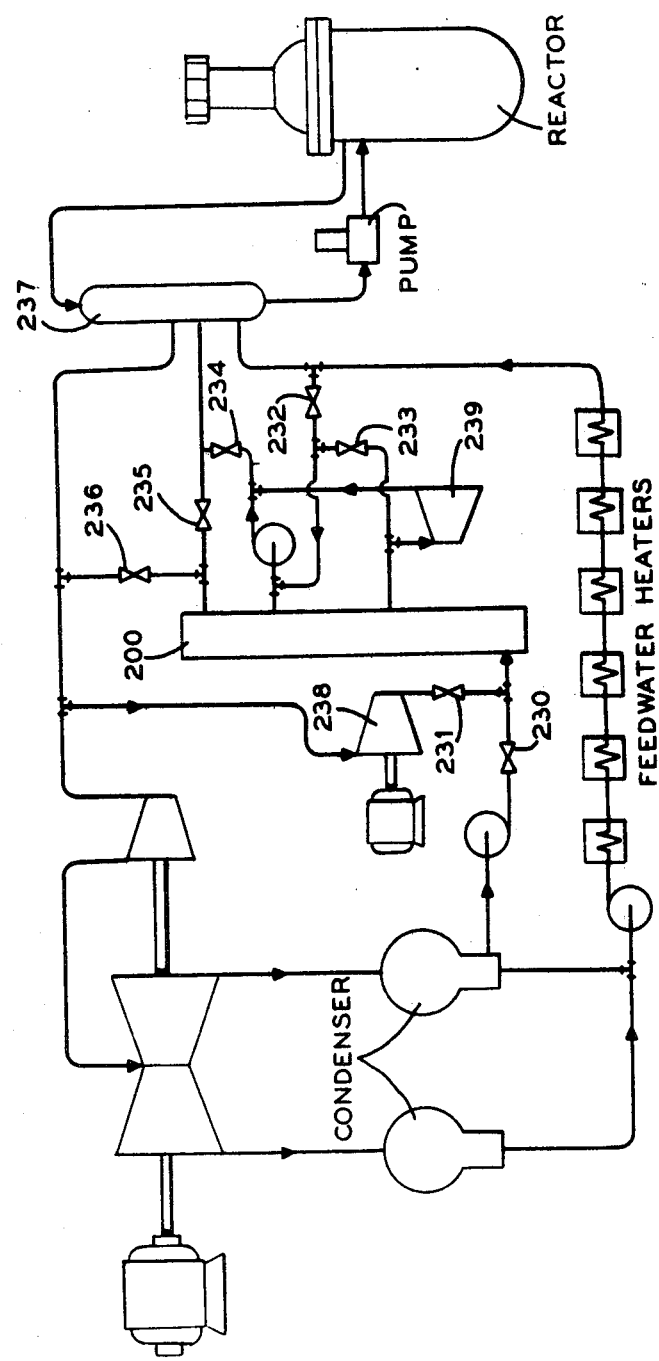
FIG. 10 is a view like FIG. 1 of a nuclear power plant steam cycle.

Refer now to FIG. 10 showing the single heat exchanger 200 utilized in a nuclear power plant steam cycle. In the charging mode valves 230, 232, 233 and 235 are closed and valves 231, 234 and 236 are open. High pressure steam from steam generator 237 enters the top of heat exchanger 200 passes therethrough to heat sand 13 and reenters steam generator 237.

Additional high pressure steam having been compressed by compressor 238 enters heat exchanger 200 from the bottom exits through water turbine 239 and flows back to steam generator 237.

In the discharging mode, valves 231, 234 and 236 are closed and valves 230, 232, 233 and 235 are open. Feedwater enters heat exchanger 200 at the bottom, is joined by heated feedwater admitted through valve 232 and exits to enter the steam generator at an elevated enthalpy level.

The above description and drawings are only illustrative of several embodiments which achieve the objects, features and advantages of the present invention, and it is not intended that the present invention be limited thereto. Any modifications of the present invention which come within the spirit and scope of the following claims are considered part of the present invention.

What is claimed as new and desired to be secured by Letters Patent of the United States is:

1. A heat storage and recovery system for storing excess over demand energy generated by a steam cycle electrical generating plant during slack electricity demand periods and for recovering the stored energy to provide supplemental electricity during peak electricity demand periods comprising:
moving bed heat exchanger means for exchanging heat between said system and the generating plant wherein said moving bed exchanger means comprises:
   an inlet header having an inlet tube sheet;
   an outlet header having an outlet tube sheet;
   said inlet header having at least one inlet for admitting fluid to said heat exchanger;
   said outlet header having at least one outlet for discharging fluid from said heat exchanger;
   a plurality of tube banks each extending generally horizontally from said inlet tube sheet to said outlet tube sheet to establish fluid communication therethrough between said inlet header and said outlet header;
   a shell encasing said plurality of tubes and being open at the top and the bottom;
   said inlet header and said outlet header each having a plurality of diaphragms dividing said headers into a plurality of compartments;
   said plurality of diaphragms including a number of section diaphragms being positioned in said headers between a corresponding number of same pairs of tube banks to divide the heat exchanger into a corresponding number of sections, and further including a number of subsection diaphragms being positioned in said headers between every other pair of tube banks and staggered as between headers such that each of said compartments is in fluid communication with the inlet and the outlet of its section;
   said tube banks having a plurality of tubes being on a triangular pitched array and
   a plurality of orifaced plates extending below each of said tube banks to support said tube banks and to retard the flow of sand therethrough over said tubes to provide an even sand flow velocity through the shell side of said heat exchanger and to provide a high sand bed density in contact with the entire periphery of each tube;
conduit means for establishing fluid communication between the steam cycle and said moving bed heat exchanger means wherein said conduit means comprises:
   a plurality of turbine steam extraction pipes to separately divert intermediate and low pressure turbine steam to said heat exchanger means;
   a plurality of feedwater heat pipes to separately direct the fluid diverted by said plurality of turbine steam extraction pipes, after having passed through said moving bed heat exchanger means, through feedwater heaters to be returned to the steam cycle at the main feedwater portion of the cycle;
   a third pipe to establish fluid communication between the reheat portion of the steam cycle and said moving bed heat exchanger means for extracting reheated steam from the steam cycle;
   a fourth pipe to establish fluid communication between said moving bed heat exchanger means and the steam cycle below the high pressure turbine and above the reheater to return the fluid extracted from the steam cycle via said third pipe; and,
   a fourth pipe pump to pump the fluid through said pipe;
   valve means for selectively opening and closing said conduit means to selectively admit fluid from different points in the steam cycle to said moving bed heat exchanger means;
   a bed of refractory particles of suitable size for flowing through said moving bed heat exchanger means;
   storage means for storing said bed of refractory particles; and,
   transport means for transporting said refractory particles between said storage means and said moving bed heat exchanger means.

2. A system as in claim 1 further comprising a recovery mode steam cycle for producing electricity during peak electricity demand periods, including,
   a recovery turbine-generator,
   a recovery condenser,
   a recovery pump, and recovery conduit means for directing fluid through said moving bed heat exchanger means, through said recovery turbine generator, through said recovery condenser, and through said recovery pump and back to said moving bed heat exchanger means to complete the cycle.

3. A system as in claim 1 wherein: said storage means includes a hot silo and a cold silo;

said moving bed heat exchanger means includes a charging heat exchanger positioned above said hot silo wherein said refractory particles are heated by steam directed from the steam cycle, and a discharge heat exchanger positioned below said hot silo wherein feedwater is heated by said refractory particles; and, said transport means includes a first bucket elevator for lifting sand from below said discharge heat exchanger to above said cold silo, a second bucket elevator for lifting sand from said cold silo to above said charging heat exchanger, first conveyer means to convey said refractory particles flowing out of said discharge moving bed heat exchanger to said first bucket elevator, second conveyer means to convey said refractory particles from said first bucket elevator to said cold silo, third conveyer means to convey refractory particles flowing from said cold silo to said second bucket elevator, fourth conveyer means to convey sand from said second bucket elevator to said charging heat exchanger to flow down therethrough.

4. A system as in claim 1 wherein: said storage means includes a single insulated silo;

said moving bed heat exchanger means includes a single moving bed heat exchanger for both charging and discharging said bed of refractory materials;

said transport means includes a first Archimedes' lift to move said refractory particles from below said silo to above said moving bed heat exchanger and a second Archimedes' lift to move said refractory particles below said heat exchanger to above said silo.

5. A system as in claim 4 where each of said Archimedes' lifts include a pressurizing means to maintain a pressure differential between the ends of each of said lifts to promote the diffusion of air through the lift thereby fluidizing the refractory particles being conveyed therein.

6. A moving bed heat exchanger comprising:
an inlet header having an inlet tube sheet;
an outlet header having an outlet tube sheet;
said inlet header having at least one inlet for admitting fluid to said heat exchanger;
said outlet header having at least one outlet for discharging fluid from said heat exchanger;
a plurality of tube banks each extending generally horizontally from said inlet tube sheet to said outlet tube sheet to establish fluid communication therethrough between said inlet header and said outlet header;
a shell encasing said plurality of tubes and being open at the top and the bottom;
said inlet header and said outlet header each having a plurality of diaphragms dividing said headers into a plurality of compartments;
said plurality of diaphragms including a number of section diaphragms being positioned in said headers between a corresponding number of same pairs of tube banks to divide the heat exchanger into a corresponding number of sections, and further including a number of subsection diaphragms being positioned in said headers between every other pair of tube banks and staggered as between headers such that each of said compartments is in fluid communication with the inlet and the outlet of its section;
said tube banks having a plurality of tubes being on a triangular pitched array; and
a plurality of orifaced plates extending below each of said tube banks to support said tube banks and to retard the flow of sand therethrough over said tubes to provide an even sand flow velocity through the shell side of said heat exchanger and to provide a high sand bed density in contact with the entire periphery of each tube.

* * * * *